Jan. 24, 1933.　　　W. H. VENZIE　　　1,895,239
CAMERA SILHOUETTE MACHINE
Filed Sept. 21, 1931　　3 Sheets-Sheet 3
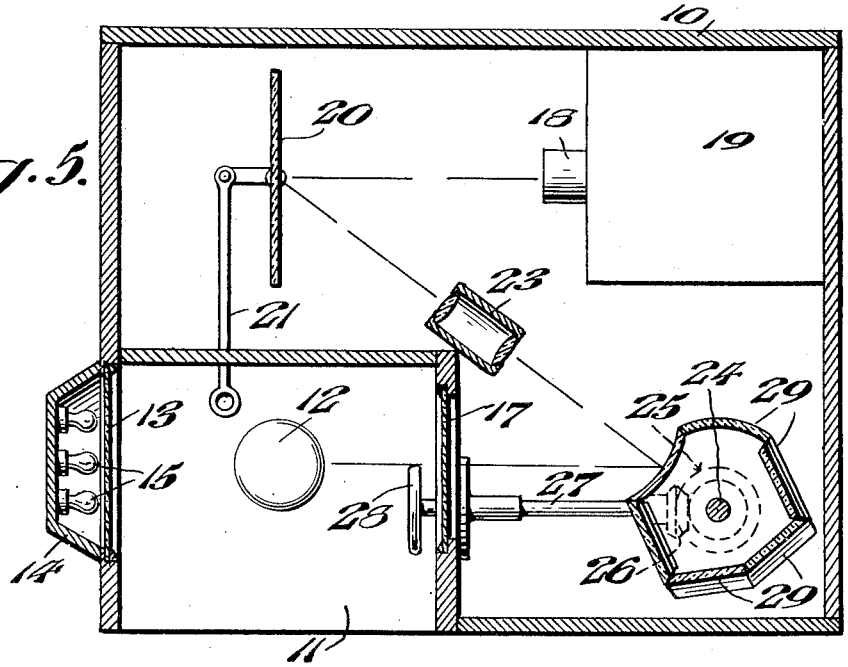
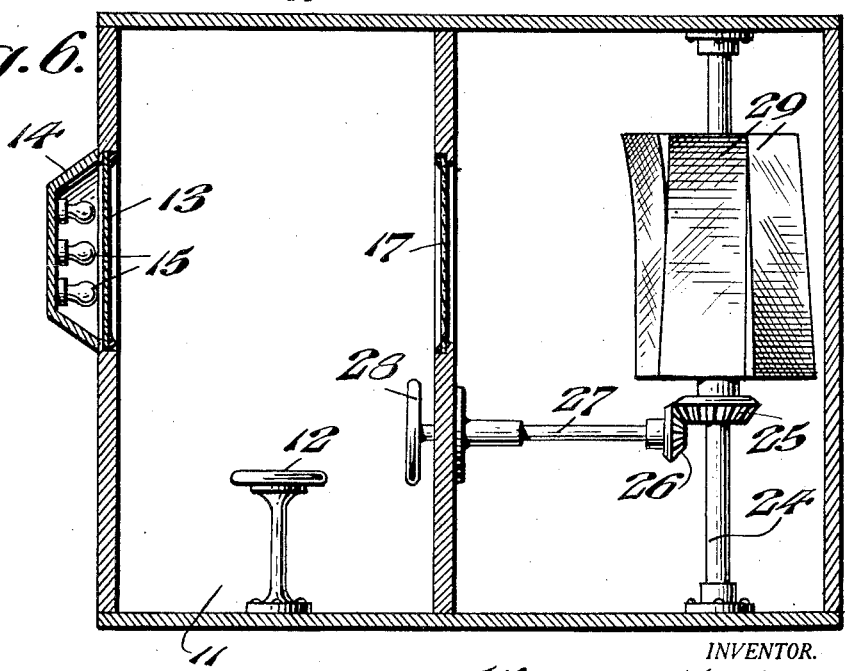
INVENTOR.
Walter H. Venzie
BY
William J. Jackson
ATTORNEY.

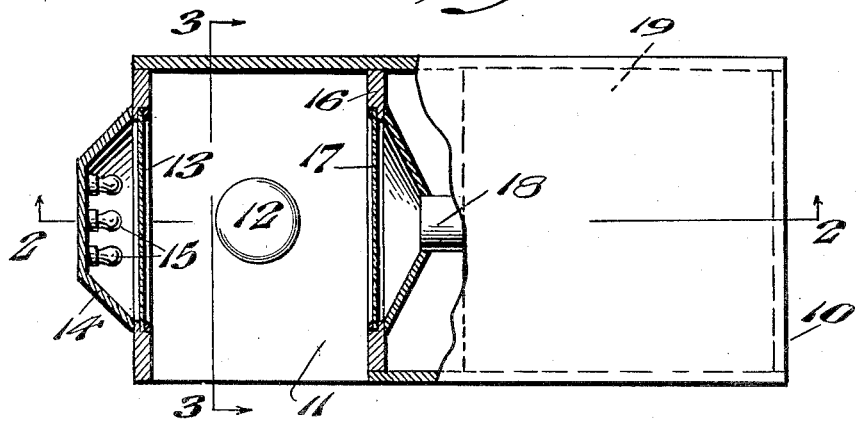
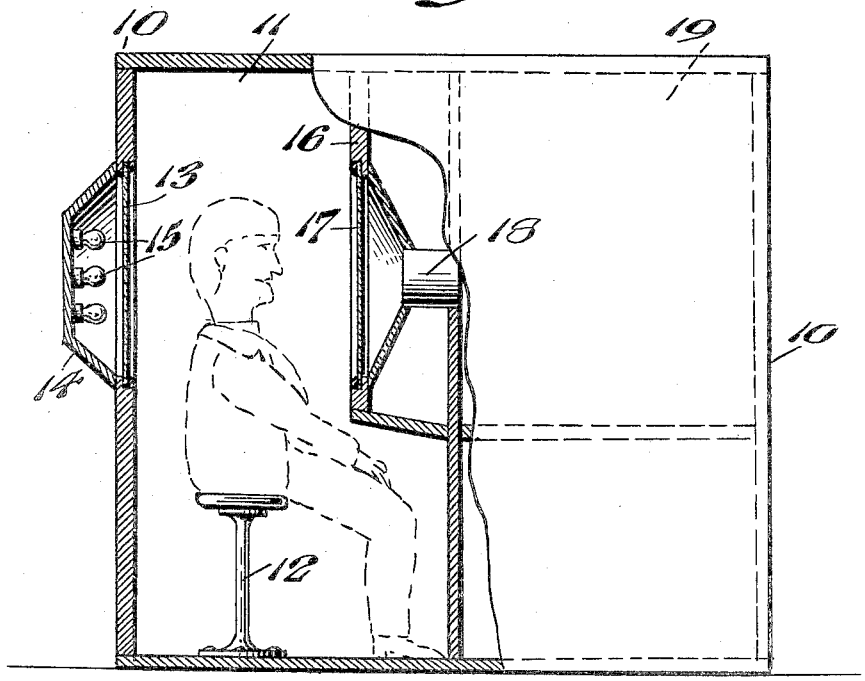

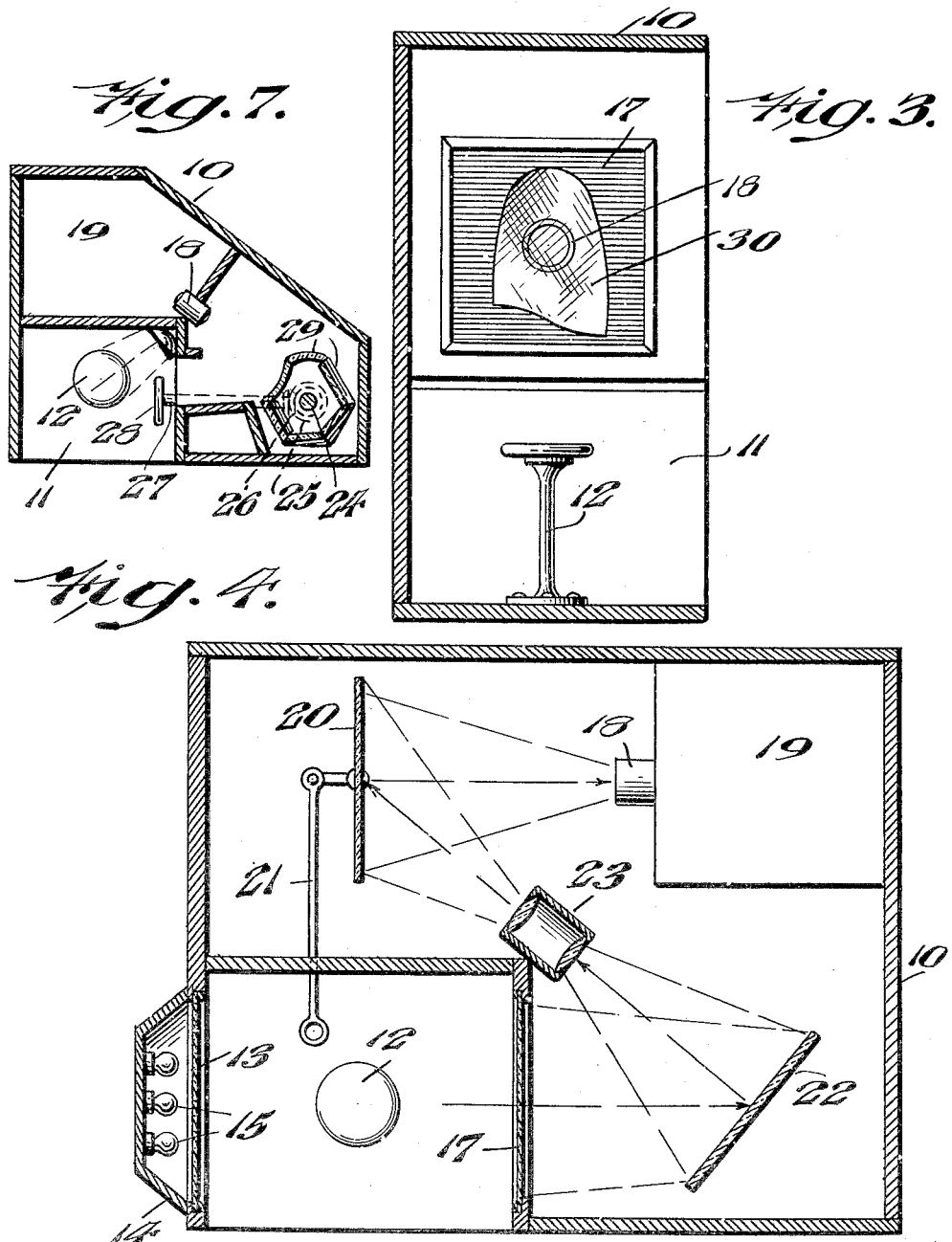

Patented Jan. 24, 1933

1,895,239

UNITED STATES PATENT OFFICE

WALTER H. VENZIE, OF PHILADELPHIA, PENNSYLVANIA

CAMERA-SILHOUETTE MACHINE

Application filed September 21, 1931. Serial No. 563,981.

This invention, stated in its broadest terms, relates to shadow projecting devices and has more especial relation to apparatus whereby photographs of silhouettes may be produced.

Heretofore in the preparing of silhouettes it has been necessary for an attendant in charge to make a silhouette of the subject seated before him. According to the present invention it is proposed that a person may seat himself before a screen and through a combination of mirrors, lenses, and reflectors, including a camera, be able to individually photograph his silhouette and carry away with him the completed silhouette.

This may be said to be the leading object of the present invention.

A further object of the present invention is to provide an arrangement of parts whereby the person seated before the screen may by a special arrangement of parts obtain a distorted depiction of himself.

Other and further objects of the present invention reside in the provision of an arrangement, combination, and connection of parts for attaining the results sought by the foregoing objects.

The invention consists of the novel construction hereinafter described and finally claimed.

The nature, characteristic features and scope of the invention will be more fully understood from the following description taken in connection with the accompanying drawings forming part hereof, and in which:

Fig. 1 is a top or plan view partly in section of apparatus embodying the present invention;

Fig. 2 is a view in longitudinal section taken approximately upon the line 2—2 of Fig. 1;

Fig. 3 is a view in cross-section taken upon the line 3—3 of Fig. 1;

Fig. 4 is a view in horizontal section of a slightly modified form of the invention;

Fig. 5 is a similar view of a still further modified form of the invention;

Fig. 6 is a vertical sectional view of Fig. 5; and

Fig. 7 is a view in horizontal section of a slightly modified form of the invention.

For the purpose of illustrating my invention I have shown in the accompanying drawings several forms thereof which are at present preferred by me, since the same have been found in practice to give satisfactory and reliable results, although it is to be understood that the various instrumentalities of which the invention consists can be variously arranged and organized and that the invention is not limited to the precise arrangement and organization of the instrumentalities as herein shown and described.

Referring to the drawings in detail, and with more especial relation to Figs. 1, 2, and 3, the reference numeral 10 designates a cabinet closed at all points except an entrance portion 11 wherein is stationed a seat 12. Adjacent the seat 12 and to the rear of the entrance opening 11 there is provided a fixed screen or panel 13 of translucent material. This screen or panel is supported in the end wall of the cabinet 10. To the rear of the screen or panel 13 is an extension 14 within which extension and to the rear of the panel or screen 13 are a plurality of incandescent bulbs 15. Arranged in advance of the seat 12 is a partition 16 provided with a fixed panel or screen 17 of translucent material. In alignment with the fixed panel 17 is a lens holding member 18 forming part of a camera 19 not shown in detail in the drawings. The subject to be photographed seats himself upon the stool 12 in cabinet 10 and the rays of light from the bulbs 15 passing through screen 13 cast the subject's figure upon screen 17 whereupon the subject's outline may be photographed by camera 19. The camera 19 may be of any standard equipment and operated either by the subject photographing himself or by an attendant in charge, and the lighting system may be operated in any conventional manner.

Referring now to Fig. 4, a slightly modified form of apparatus is disclosed and in lieu of the fixed screen or panel 17 a tiltable screen or panel 20, operable by a lever 21, is provided so that the subject making a photograph of himself may tilt the screen or panel 20 in order to provide a more or less distorted silhouette-like outline of himself upon the screen or panel 20 so that the camera 19 will register such a likeness. In conjunction with the tiltable screen a fixed mirror 22 is provided within the cabinet 10 which panel or screen is arranged at an inclination with respect to the fixed panel or screen 17. This panel 22 is arranged in alignment with a lens 23. This lens 23 in turn is so arranged that it may be caused to become aligned with the shiftable screen or panel 20 as the subject operates the lever 21.

Referring now to Figs. 5 and 6, the construction is the same as that previously described with the exception that a device is present within cabinet 10 whereby the subject seated upon stool 12 by proper manipulation of certain parts may distort his features so that the camera 19 portrays in the finished film a more or less ludicrous depiction. Specifically stated, the device for securing such distorted features comprises a vertically disposed rotatable shaft 24 provided with a bevelled gear 25 in mesh with the bevelled gear 26 which in turn is supported upon a horizontally arranged shaft 27 provided with a hand wheel 28 which is extended into the entrance chamber 11. Fixed to the vertically arranged shaft 24 are a plurality of lenses 29 some of which are convexly arranged, others concavely, and still others having a plane surface. Thus, as the subject making a picture of himself rotates by means of the hand wheel 28 the lenses 29, a variation of features is presented to the lens of the camera 19 so that a more or less grotesque reproduction is portrayed upon the camera film.

Referring now to the modified form shown in Fig. 7, the construction above described is the same with the exception that the casing 10 has incorporated therein a camera 19 disposed at an acute angle with relation to the lenses 29. By this arrangement of parts the subject seated before the opening in the cabinet 10 may have his features transferred by means of the lenses 29 to the camera 19.

In Fig. 3 the translucent panel 13 is shown as having thereon a centrally arranged translucent portion 30 which in practice is adapted to accept the silhouette in order to give the latter outline and contour to conform with regulation silhouette design.

What is claimed is:

1. In a photographic apparatus, an enclosed cabinet provided with an entrance having a seat for a subject to be photographed, a camera within said cabinet, a lighting system arranged in the rear of said seat, a fixed translucent panel arranged in advance of said seat and adapted to transfer the subject's image to the lens of said camera for reproduction.

2. In a photographic apparatus, an enclosed cabinet provided with an entrance having a seat for a subject to be photographed, a camera within said cabinet, a lighting system arranged in the rear of said seat, at least one fixed translucent panel arranged in advance of said seat and adapted to transfer the subject's image to the lens of said camera for reproduction.

3. In a photographic apparatus, an enclosed cabinet provided with an entrance having a seat for a subject to be photographed, a camera within said cabinet, a lighting system arranged in the rear of said seat, at least one fixed translucent panel arranged in advance of said seat and adapted to transfer the subject's image to the lens of said camera for reproduction, and a panel of translucent material arranged in alignment with the camera lens.

4. In a photographic apparatus, an enclosed cabinet provided with an entrance having a seat for a subject to be photographed, a camera within said cabinet, a lighting system arranged in the rear of said seat, at least one fixed translucent panel arranged in advance of said seat and adapted to transfer the subject's image to the lens of said camera for reproduction, a panel of translucent material arranged in alignment with the camera lens, and a fixed lens arranged between said various panels.

5. In a photographic apparatus, an enclosed cabinet provided with an entrance having a seat for a subject to be photographed, a camera within said cabinet, a lighting system arranged in the rear of said seat, at least one fixed translucent panel arranged in advance of said seat and adapted to transfer the subject's image to the lens of said camera for reproduction, a panel of translucent material arranged in alignment with the camera lens, a fixed lens arranged between said various panels, and means for tilting that panel which is in alignment with the camera lens.

6. In a photographic apparatus, an enclosed cabinet provided with an entrance having a seat for a subject to be photographed, a camera within said cabinet, a lighting system arranged in the rear of said seat, at least one fixed translucent panel arranged in advance of said seat and adapted to transfer the subject's image to the lens of said camera for reproduction, a panel of translucent material arranged in alignment with the camera lens, a fixed lens arranged between said various panels, means for tilting that panel which is in alignment with the camera lens, and means rotatably arranged between said fixed panel and said camera for deflecting a distorted projection of the subject to the camera.

WALTER H. VENZIE.